J. JENKINS.
SAFETY-PINS.
No. 195,825.  Patented Oct. 2, 1877.
Fig: 1.
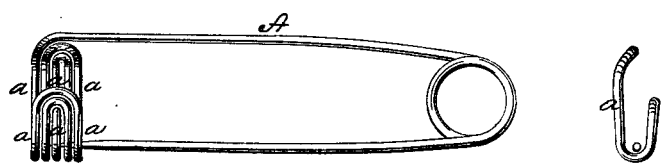
Fig: 2.
Fig: 3.
Witnesses:  
Chas. Nida  
H. L. Wattenberg
Inventor:  
Joel Jenkins  
per G. M. Flynn Kim.  
Atty.

UNITED STATES PATENT OFFICE.

JOEL JENKINS, OF BROOKLYN, NEW YORK.

IMPROVEMENT IN SAFETY-PINS.

Specification forming part of Letters Patent No. 195,825, dated October 2, 1877; application filed June 23, 1877.

*To all whom it may concern:*

Be it known that I, JOEL JENKINS, of the city of Brooklyn, county of Kings and State of New York, have invented a new and Improved Toilet-Pin; and that the following is a full, clear, and exact description of the same, reference being had to the accompanying drawings, and to the letters of reference marked thereon, making part of this specification.

This invention is in the nature of an improvement in toilet-pins; and the invention consists in, as a new article of manufacture, a toilet-pin, with the guard thereof integral with the wire of the pin, which guard is composed of a series of parallel convolutions lying closely together, forming a flat surface or bearing, which surface is bent over, making a recess with two parallel flat sides, within which recess is received the point of the pin, which is protected by the upper and lower surface of the guard.

In the accompanying sheet of drawings, Figure 1 is a plan or top view of my improved toilet-pin. Fig. 2 is an end view of guard, and Fig. 3 an end view of guard with obstruction.

Similar letters of reference indicate like parts in the several figures.

A represents a toilet-pin made from wire, the unsharpened end of which is bent into a series of convolutions, $a$, which are parallel and close together, forming a flat surface. The surface in this way formed is next bent over, as shown in Fig. 2, or in a hook form, so that when the sharpened end of the pin is placed within the hooked or bent-over portion, its point is completely guarded, and prevented from injuring the user.

To prevent the point of the pin from being withdrawn from the guard $a$ by accident, a small obstruction, $c$, is formed in the under surface of the guard by bending one or more of the convolutions, as shown in Fig. 3. This offers no obstruction to the free insertion of the pin within the guard, but offers just enough resistance to its being withdrawn therefrom to hinder accidental displacement.

The bending of the wire to form the guard may be readily accomplished by machinery, or by hand, if desired.

A toilet-pin, with the guard formed as I have above described it, is not only cheaper to make, but more durable, since the guard cannot be detached from the wire of the pin with any ordinary usage, the guard and wire of the pin being integral. Besides, the guard in this way made is sufficiently stiff and rigid to prevent its collapsing or closing in such a way as to prevent the entrance of the pin within it.

I am aware that Letters Patent of the United States were granted to Elam H. Gaylord on the 31st day of August, 1875, No. 167,328, for a toilet-pin, and I disclaim the invention therein described; but

Having now described my invention, what I claim as new, and desire to secure by Letters Patent, is—

As a new article of manufacture, a toilet-pin, A, with the guard thereof integral with the wire of the pin, which guard is composed of a series of parallel convolutions, $a$, lying closely together, forming a flat surface or bearing, which surface is bent over, making a recess with two parallel flat sides, within which recess is received the point of the pin, which is protected by the upper and lower surfaces of the guard, substantially as shown and described.

JOEL JENKINS.

Witnesses:
H. L. WATTENBERG,
G. M. PLYMPTON.